UNITED STATES PATENT OFFICE.

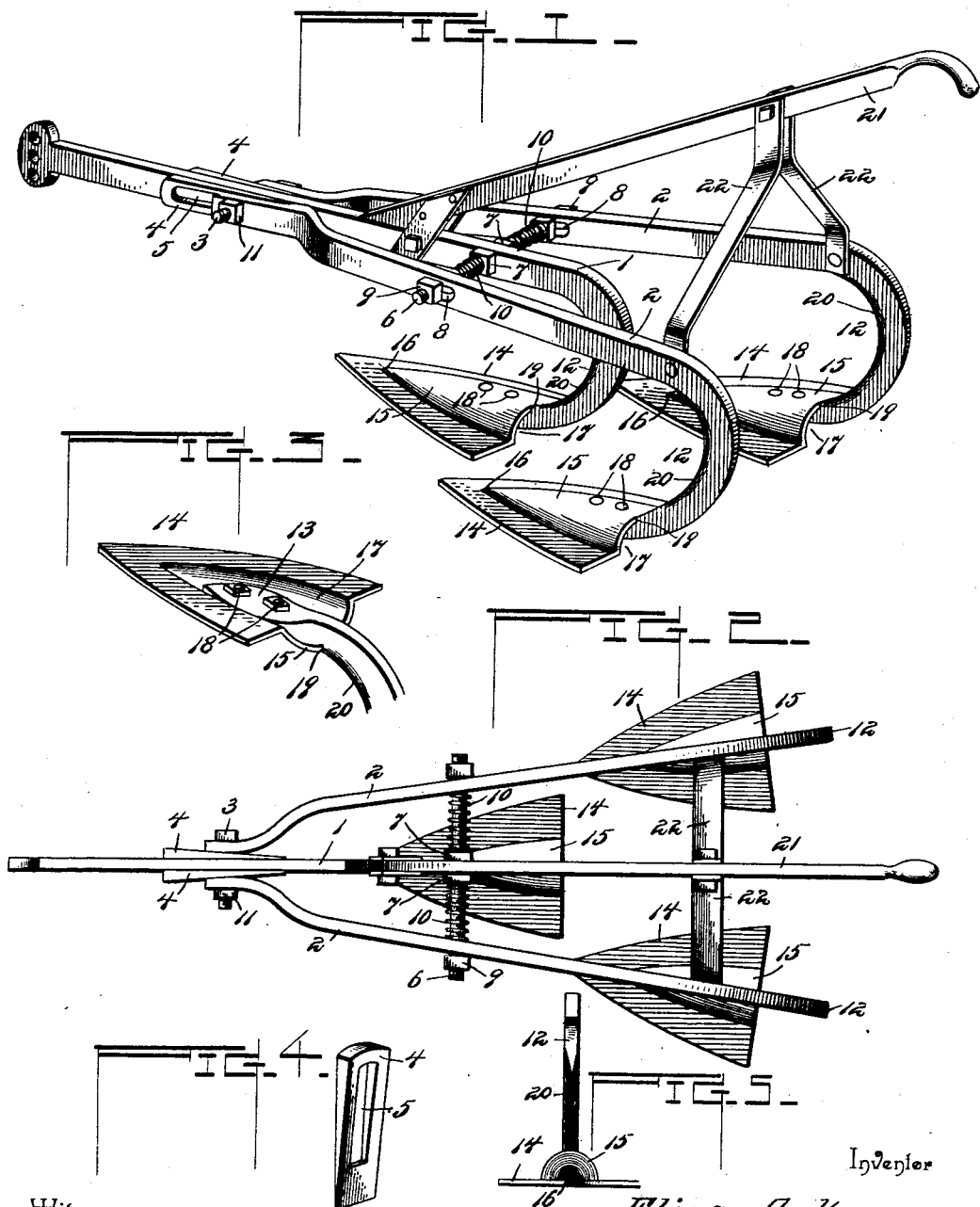

ELIAS ACKORS, OF GUTHRIE, OKLAHOMA TERRITORY.

CULTIVATOR.

SPECIFICATION forming part of Letters Patent No. 590,353, dated September 21, 1897.

Application filed March 20, 1897. Serial No. 628,499. (No model.)

*To all whom it may concern:*

Be it known that I, ELIAS ACKORS, a citizen of the United States, residing at Guthrie, in the county of Logan and Territory of Oklahoma, have invented a new and useful Cultivator, of which the following is a specification.

This invention relates to cultivators, its principal object being to improve the construction of the shovels and the manner of attaching them to the beams, whereby the shovels will loosen and pulverize the soil without turning it over, and the shovels and beams will offer a minimum of resistance while being drawn through the soil.

With these and other objects in view the invention consists of the several details of construction and combination of the several parts, as will be hereinafter fully described, and then particularly pointed out in the claims.

In the drawings, Figure 1 is a perspective view of one section of a cultivator embodying my invention. Fig. 2 is a plan view. Fig. 3 is a perspective view of the bottom of one of the shovels, showing the manner of attaching it to the beam. Fig. 4 is a perspective view of a detached detail. Fig. 5 is a front elevation of a portion of one of the beams and the shovel.

Similar reference-numerals indicate similar parts in the several figures.

1 indicates the main beam, and 2 the side beams. The front ends of the side beams are connected to the forward portion of the main beam by a bolt 3, and wedges 4 are inserted between the opposing faces of the beams. Each of these wedges is provided with a longitudinal slot 5, through which the bolt 3 passes. The side beams 2 are also connected intermediate their ends to the rear portion of the main beam 1 by means of a threaded rod 6, which is clamped in position to the main beam 1 by the nuts 7 on opposite sides of the said beam. The ends of the threaded rods 6 pass through elongated openings 8 in the side beams 2, and nuts 9 on the ends of the rod engage the outer faces of the side beams 2. Coiled springs 10 surround the rod 6 between the nuts 7 and the inner faces of the side beams 2 and normally tend to force the rear ends of the beams 2 apart. By this arrangement the shovels carried by the said beams may be adjusted laterally relatively to the shovel carried by the main beam, and in order to accomplish this adjustment the nut 11 on the bolt 3 is loosened sufficiently to permit the ends of the side beams to rock on the bolt, and the rear ends of the beams 2 are then adjusted to the desired position by tightening or loosening the nuts 9 on the threaded beam 6, after which the wedges 4 will be adjusted and the nut 11 again tightened, when the front ends of the side beams will be rigidly clamped to the main beam.

The rear end of each beam is curved downwardly and forwardly, as indicated at 12, and the end of each beam is flattened and widened transversely, as indicated at 13. The shovels are marked 14 and are substantially triangular in form, with their two side edges slightly curved. Each shovel is provided with an upwardly-bulged portion 15, which tapers forwardly from the rear end of the shovel to a point 16, and the side boundary-lines of this upwardly-bulged portion 15 are substantially equidistant throughout from the side edges of the shovel, and that part of the shovel around the upwardly-bulged portion is flat and occupies the same horizontal plane throughout its entire area. The flattened ends 13 of the beams are fitted in the recesses 17 in the under side of the shovels, which are formed by the upwardly-bulging portions 15 and firmly secured to the shovels by bolts 18. Each beam is recessed in its front edge, as indicated at 19, in order to allow the upper surface of the shovel to be flush with the edge of the beam, and the front edge of each beam is formed with a knife-edge, as indicated at 20 in Fig. 5, which knife-edge will extend above the shovel about eight or ten inches.

21 indicates the handle, which is secured at its forward end to the main beam 1, and 22 indicates braces, preferably of spring metal, which connect the rear end of the handle 21 to the rear portions of the side braces 2.

In practice two sections will be used, each similar to the one illustrated and described, and they will be coupled together at their front ends in any approved manner, and the draft connection will be so arranged that the depth of penetration of the shovels may be adjusted in any well-known manner. These features need not, however, be herein especially described, since they form no part of my present invention.

In operation the shovels will cut under the soil at the required depth and the upwardly-bulging portion of the shovel will press the soil sidewise, but not turn it, and as the soil passes off the shovel at its rear end it will be pulverized and loosened; but the moist under soil will not be turned up, and consequently the soil will not lose its moisture, as would be the case if the soil were turned over. At the same time weeds are effectually loosened at their roots and quickly die. The shovels can work close up to the plants without danger of covering them with the soil, which is also a great advantage with delicate plants. By providing the beams with a knife-edge above the shovels they will pass freely through the soil, and as the ends of the beams and the securing-bolts are in the recesses in the shovels above the plane of the lower faces of the shovels there will be no resistance offered by the beams, and the draft of the cultivator will therefore be reduced to a minimum.

It will be understood that changes in the form, proportion, and minor details of construction may be resorted to without departing from the spirit or sacrificing any of the advantages of this invention.

Having thus described my invention, what I claim is—

1. In a cultivator, the combination with a shovel substantially triangular in form and having an upwardly-bulging portion midway its width tapering forwardly from its rear end to a point, whereby a recess is formed in the under side of the shovel, and that part of the shovel around the upwardly-bulging portion being flat and in the same horizontal plane throughout its entire area, of a beam having its lower end seated in said recess, and means to secure the shovel to the beam, substantially as described.

2. In a cultivator, the combination with a shovel substantially triangular in form and having an upwardly-bulging portion midway its width tapering forwardly from its rear end to a point, whereby a recess is formed in the under side of the shovel, and that part of the shovel around the upwardly-bulging portion being flat and in the same horizontal plane throughout its entire area, of a beam having its rear portion bent downwardly and forwardly and its end flattened and widened, said widened and flattened end being seated in the recess in the shovel and said beam being recessed at its upper edge to receive the rear edge of the shovel, and means to secure the shovel to the end of the beam, substantially as described.

3. A cultivator-shovel substantially triangular in form and having an upwardly-bulging portion tapering forwardly from its rear end to a point, and that part of the shovel around the upwardly-bulging portion being flat and in the same horizontal plane throughout its entire area, substantially as described.

4. A cultivator-shovel substantially triangular in form and having an upwardly-bulging portion tapering forwardly from its rear end to a point, the side boundary-lines of said bulging portion being substantially equidistant throughout from the sides of the shovel, and that part of the shovel around the upwardly-bulging portion being flat and in the same horizontal plane throughout its entire area, substantially as described.

5. In a cultivator, the combination with the main beam, of two side beams, a bolt connecting the front ends of the side beams to the front portion of the main beam, a rod rigidly secured to the rear portion of the main beam with its ends extending through elongated openings in the side beams, adjusting-nuts on the ends of said rod, a spring interposed between the main beam and the inner faces of the side beams, whereby the side beams may be adjusted laterally relatively to the main beam, substantially as described.

6. In a cultivator, the combination with the main beam, of two side beams, slotted wedges interposed between the opposing faces of the front ends of the beam and the main frame, a bolt passing through the front ends of the side beams, the slotted wedges and the front portion of the main beam, a rod connecting the rear portion of the main beam to the side beams, springs on said rod between the main beam and the inner faces of the side beam, and adjusting-nuts on said rod and the said bolt, substantially as described.

In testimony that I claim the foregoing as my own I have hereto affixed my signature in the presence of two witnesses.

ELIAS ACKORS.

Witnesses:
 D. D. SLOCUM,
 E. J. BLACKMAN.